Aug. 8, 1939.   P. M. RAIGORODSKY   2,168,683
ABSORPTION PROCESS
Filed July 1, 1937   2 Sheets-Sheet 1

P.M. RAIGORODSKY
Inventor

By
Attorneys

Patented Aug. 8, 1939

2,168,683

UNITED STATES PATENT OFFICE 2,168,683

ABSORPTION PROCESS

Paul M. Raigorodsky, Tulsa, Okla., assignor to Petroleum Engineering, Inc., Tulsa, Okla.

Application July 1, 1937, Serial No. 151,512

7 Claims. (Cl. 196—8)

This invention relates to a method and an apparatus for the practice thereof, for the recovery of gasoline and lighter hydrocarbon constituents from various gases, such as natural gas, casinghead gas, refinery still gases and the like. It has for its principal object increasing the yield of desirable hydrocarbons from such gases, reducing the quantity of absorption menstruum required for absorption purposes, and reducing the amount of power, process steam and other utilities.

A particular object is to provide a multi-stage absorption process wherein a different absorption menstruum is used in each absorption stage.

Another specific object is to provide a method and an apparatus for the practice thereof, for cooling the absorption menstruums below temperatures mormally obtainable with cooling water in accomplishing the aforementioned principal object.

In the conventional absorption system, gas, containing desirable hydrocarbons to be recovered therefrom, is passed through one or more absorbers in counter-current to a circulating stream of a single absorption menstruum, which, after passing through the absorbers, is stripped of absorbed hydrocarbons and returned to the absorbers for absorption of additional hydrocarbons. In such a system, the absorption menstruum is ordinary mineral seal oil having an A. P. I. gravity of 38 to 42 degrees.

Such a system is ordinarily quite efficient in recovering the constituents of natural gas which are higher boiling than butane, and by certain modifications, such as increased rate of oil circulation, increased pressure, refrigeration of the absorption oil, and the like, may be made effective for recovering relatively large amounts of butane and even lighter constituents. However, such modifications require equipment of increased size to handle the larger oil flow, and more power for pumping and handling the increased oil rate, and increased amounts of process stream for removing the absorbed hydrocarbons from the absorption menstruum, and are therefore relatively expensive to construct and operate.

To provide an efficient absorption process, which will overcome many of the disadvantages of the aforedescribed conventional processes particularly in recovering increased amounts of butane and lighter hydrocarbons from gas, this invention contemplates a combination process in which the gas is treated by multi-stage absorption utilizing a relatively light absorbent in an earlier absorption stage and a relatively heavy absorbent in a later absorption stage, and wherein the gas and liquid in the earlier absorption stage are cooled to temperatures below those normally obtainable with ordinary cooling water.

As absorption menstruums, this invention contemplates the use in the earlier absorber of a menstruum comprising the heavier gasoline constituents recovered from the gas. Such a menstruum has several advantages over the conventional mineral seal oil type absorbents. Since the efficiency of absorption is largely dependent upon the ratio of the number of mols of menstruum to the number of mols of gas contacted, and since a unit volume of such a gasoline menstruum will contain an appreciably larger number of pound-mols than an equal volume of mineral seal oil, a proportionately smaller volume of gasoline menstruum will be required for the same absorption capacity.

Other advantages are higher heat transfer coefficient, resulting in saving of size and cost of heat exchange equipment, lower boiling range resulting in reduced danger of decomposition of the menstruum during distillation, and relative cleanliness of the menstruum, which being a product of the process in which it is used, is continuously renewed and replaced by fresh menstruum.

However, these advantages are off-set to some extent by the fact that such a menstruum which contains gasoline constituents will have appreciable vapor pressure and on contact with gas in the absorber, will vaporize to some extent with a consequent loss of desirable gasoline constituents in the gas.

To recover constituents which are vaporized in this manner, a conventional mineral seal oil type absorbent is utilized in the later absorption stage and the later absorption stage and the oil cycle utilized therewith are operated in the conventional manner.

However, it is found that by utilizing the dual absorbent system above described, a very material reduction in total volume of oil circulated is accomplished with the consequent reduction in size of equipment and power requirements, as well as increased efficiency of extraction of the desirable hydrocarbons from the gas.

A novel method and apparatus for contacting the absorbents and gas at relatively low temperature provides an additional step in combination with the dual absorbent features above outlined to further the efficiency of extractions of desirable hydrocarbons from the gas.

This step comprises a method for removing the heat of absorption from the menstruum throughout its passage through the absorber to thereby maintain a substantially uniform, relatively low temperature gradient throughout the absorber, and contemplates, as a heat removing agent, the use of a liquified low boiling hydrocarbon, such as propane, which is partially expanded to produce a refrigerating temperature, and further contemplates for use as refrigerants, such hydrocarbons produced in the recovery process.

Other objects and advantages of this invention will become apparent from a consideration of the following description in conjunction with the accompanying drawings in which.

Figure 1:
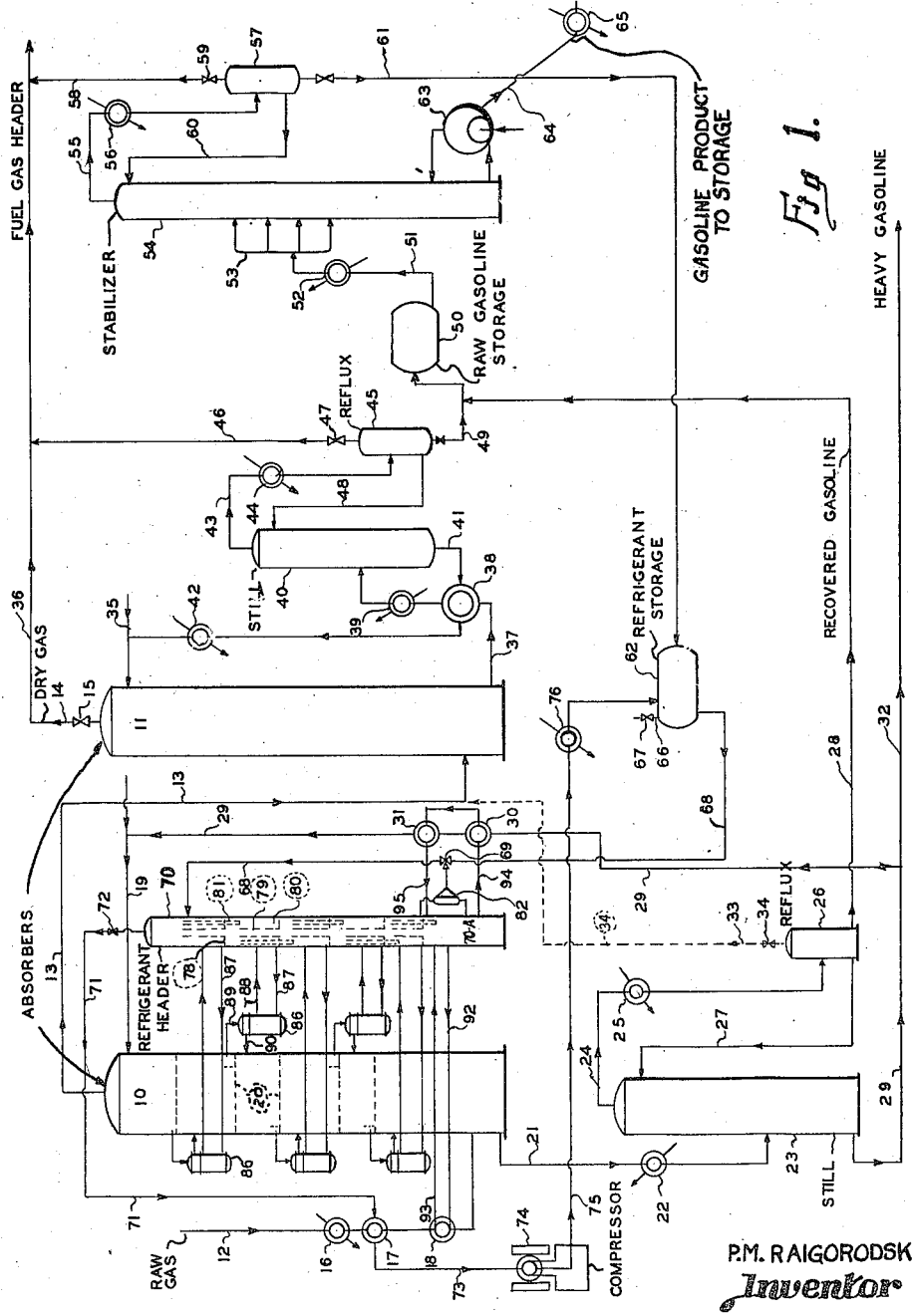
Fig. 1 illustrates a diagrammatic arrangement of apparatus for practicing this invention.

Referring to the drawings and Fig. 1 in particular, two absorbers 10 and 11 are arranged so that gas to be treated enters through pipe 12 near the foot of absorber 10, is removed from a point near the top thereof by a pipe 13 and is introduced thereby at point near the foot of absorber 11 and is finally vented from the upper portion of absorber 11 through a pipe 14 having a valve 15 mounted therein. A water cooler 16 and refrigerant coolers 17 and 18 are interposed in pipe 12 for cooling the gas passing therethrough. The particular manner in which these coolers function will be described in greater detail hereinafter.

A relatively light absorbent consisting of the heavier gasoline recovered in the process as will be explained hereafter in greater detail, is introduced through a pipe 19 into the upper portion of absorber 10 and flows downwardly therethrough over plates, such as conventional bubble plates 20 (Fig. 2), from which the absorbent extracts substantially all the desirable hydrocarbons contained therein. The gas after contact with the absorbent and containing relatively small quantities of the lighter constituents which are vaporized from the absorbent, flows through pipe 13 into absorber 11 for further treatment therein.

The absorbent, after traversing absorber 10, is withdrawn from the lower portion thereof through a pipe 21 which leads through a preheater 22 into a fractionating still 23. The enriched absorbent is heated in passage through preheater 22 by means of steam or other heating fluid to a temperature sufficient to cause vaporization only of the lighter constituents of the absorbed material on entering still 23. In still 23 the heated mixture is subjected to reflux fractionation which is sufficient only to effect a rough separation of lighter from heavier constituents. Since the heavier constituents are to be utilized as absorbent upon return to absorber 10, the presence of small amounts of the lighter constituents in the recycled absorbent is immaterial to the efficiency of the process as they flash off in absorber 10 and are later recovered in absorber 11.

The portion of the recovered constituents which are vaporized in still 23 flow from the upper portion thereof through pipe 24 which leads through a condenser 25 into a receiver 26. Ordinarily, complete condensation of the vaporized constituents is effected in condenser 25, and the liquid product collected in receiver 26. A portion of the liquid product is returned through a pipe 27 to the upper portion of still 23 to serve as reflux in accomplishing the aforementioned rough separation of light and heavy constituents of the mixture of absorbent and recovered hydrocarbons. The remainder of the liquid product is sent from receiver 26 through a pipe 28 to the gasoline stabilizing system to be described later.

The relatively heavy constituents separated from the lighter constituents in still 23 are withdrawn from the lower portion of still 23 through a pipe 29 in which are interposed coolers 30 and 31, and which leads into pipe 19 whereby these relatively heavy constituents are returned to the absorber to absorb additional hydrocarbons from the gas, and thereby completing the absorbent cycle utilized in connection with absorber 10.

As the circulation of the absorbent and recovery of additional hydrocarbons from the gas continues, the volume of relatively heavy constituents collecting in the lower portion of still 23 will increase, and to maintain the volume constant, excess heavy constituents are withdrawn from the absorbent cycle through pipe 32, which leads to gasoline storage not shown. Since this material is part of the gasoline recovered, and since it has been subjected to a reflux fractionation operation in still 23, it will be sufficiently free of high vapor pressure constituents to be included without further stabilization, in the final gasoline product of the process.

A pipe 33, in which is mounted a valve 34, is provided in connection with the upper portion of receiver 26 for the venting of vapors in case condensation in condenser 25 is incomplete, such vapors being vented through pipe 33 into pipe 13 and thence into absorber 11. Valve 34 serves as a back pressure valve to hold any desired suitable pressure in still 23.

A relatively heavy absorbent, generally of the conventional mineral seal oil type, is introduced through a pipe 35 into the upper portion of absorber 11 and flows downwardly therethrough in contact with the gas, which was introduced into the lower portion of the absorber through pipe 13. This gas, having passed through absorber 10, now contains substantially only lighter hydrocarbon constituents which were not absorbed in absorber 10 together with light constituents vaporized from the relatively light absorbent utilized in absorber 10. These light constituents are absorbed from the gas by the relatively heavy absorbent and the resulting relatively dry gas is vented from the system through pipe 14 into a fuel gas header 36 for disposal as fuel or for any other suitable purpose.

The enriched heavy absorbent is withdrawn from the lower portion of absorber 11 through a pipe 37 which leads through a heat exchanger 38 and preheater 39 into a still 40, where the absorbed hydrocarbons are vaporized and separated from the absorbent, which is withdrawn from still 40 through pipe 41 and passes through heat exchanger 38, exchanging heat with the incoming enriched absorbent, and flows thence through a cooler 42 into pipe 35 to return to absorber 11, thereby completing the absorbent oil cycle utilized with absorber 11.

The light hydrocarbons separated from the heavy absorbent in still 40 are subjected to reflux fractionation therein to completely remove entrained absorbent and emerge from still 40 through a pipe 43 which leads through a condenser 44 into a receiver 45. Any light hydrocarbons which remain uncondensed after passage through condenser 44 separate from condensate in receiver 45 and are vented therefrom through a pipe 46, having a valve 47 mounted therein, and are discharged into fuel header 36. Valve 47 is utilized as a back pressure valve to maintain a suitable pressure in still 40.

A portion of the condensate is returned from receiver 45 through a pipe 48 into the upper portion of still 40 to serve as reflux therein. The remainder of the condensate, which constitutes the lighter portion of the final product, is discharged from receiver 45 through a pipe 49 into a raw gasoline storage tank 50 which serves as the feed tank for a gasoline stabilizing system to be later described. The gasoline flowing from receiver 26 through pipe 28, as previously described, is mixed with the light gasoline flowing through pipe 49 and enters tank 50 therewith.

The gasoline in tank 50 will consist of all the hydrocarbons recovered from gas in absorbers 10 and 11 with the exception of that portion of the relatively heavy constituents, which, as noted above, is generally discharged directly to final gasoline storage, since it is a relatively stable product. From tank 50 the unstabilized gasoline, which will contain some undesirable lighter constituents recovered from the gas, which must be removed to produce the final desired product, is discharged through a pipe 51 and a preheater 52 interposed in pipe 51 and thence through a distributing header 53 into a stabilizing column 54. The raw gasoline in passing through preheater 52 will be heated to a temperature such as to assure efficient fractionation of the gasoline in column 54 and header 53 provides a means for introducing the heated gasoline at one or more spaced points in column 54, if it is found desirable to vary the point of entry of the gasoline to column 54.

Column 54 is a conventional fractionator in which the raw gasoline is fractionated at suitable temperatures and pressures and under suitable reflux conditions to sharply separate the undesired light constituents from the constituents desired in the final product. The undesired lighter constituents are removed as vapor from column 54 through a pipe 55 which leads through a reflux condenser 56 and thence into a receiver 57. Vapors remaining uncondensed after passage through condenser 56 are vented from receiver 57 through a pipe 58 equipped with a valve 59, which is utilized as a back pressure valve for controlling the stabilizer pressure, and the vented gases are discharged through pipe 58 into fuel gas header 36.

A portion of the condensate produced in condenser 56 is returned through a pipe 60 into the upper portion of column 54 to serve as reflux for the stabilization of the gasoline in column 54. The remainder of the condensate, if of suitable characteristics, will be discharged through a pipe 61 to a refrigerant storage tank 62 to be utilized in a manner to be described hereinafter.

Gasoline condensed in the rectification operations in column 54 is reboiled in a reboiler 63 to remove final traces of condensed light constituents from the final product and is then discharged from reboiler 63 through a pipe 64 and a cooler 65 to final gasoline product storage.

The process described in the foregoing description provides a highly efficient method for the recovery of hydrocarbon constituents from gas. However, the process finds its greatest advantage when utilized in recovering maximum amounts of the low boiling constituents such as butane and propane, in the recovery of which a special cooling method is utilized in connection with the absorption steps.

The apparatus utilized for providing cooling in the absorption steps comprises refrigerant storage tank 62, adapted to maintaining a supply of refrigerant, such as liquid propane, under pressure. Tank 62 is equipped with a vent pipe 66, having a valve 67, which is utilized to control the release of refrigerant vapors from tank 62 in order to regulate the pressure in tank 62. A pipe 68, in which is mounted a valve 69 leads from tank 62 into the upper portion of a refrigerant header 70, shown in detail in Fig. 2. A pipe 71 equipped with a back pressure valve 72 for controlling pressure in header 70, leads from the upper portion of header 70 through cooler 17 thence through a pipe 73 to a compressor 74 from which a pipe 75 leads through a condenser 76 into tank 62.

Figure 2:
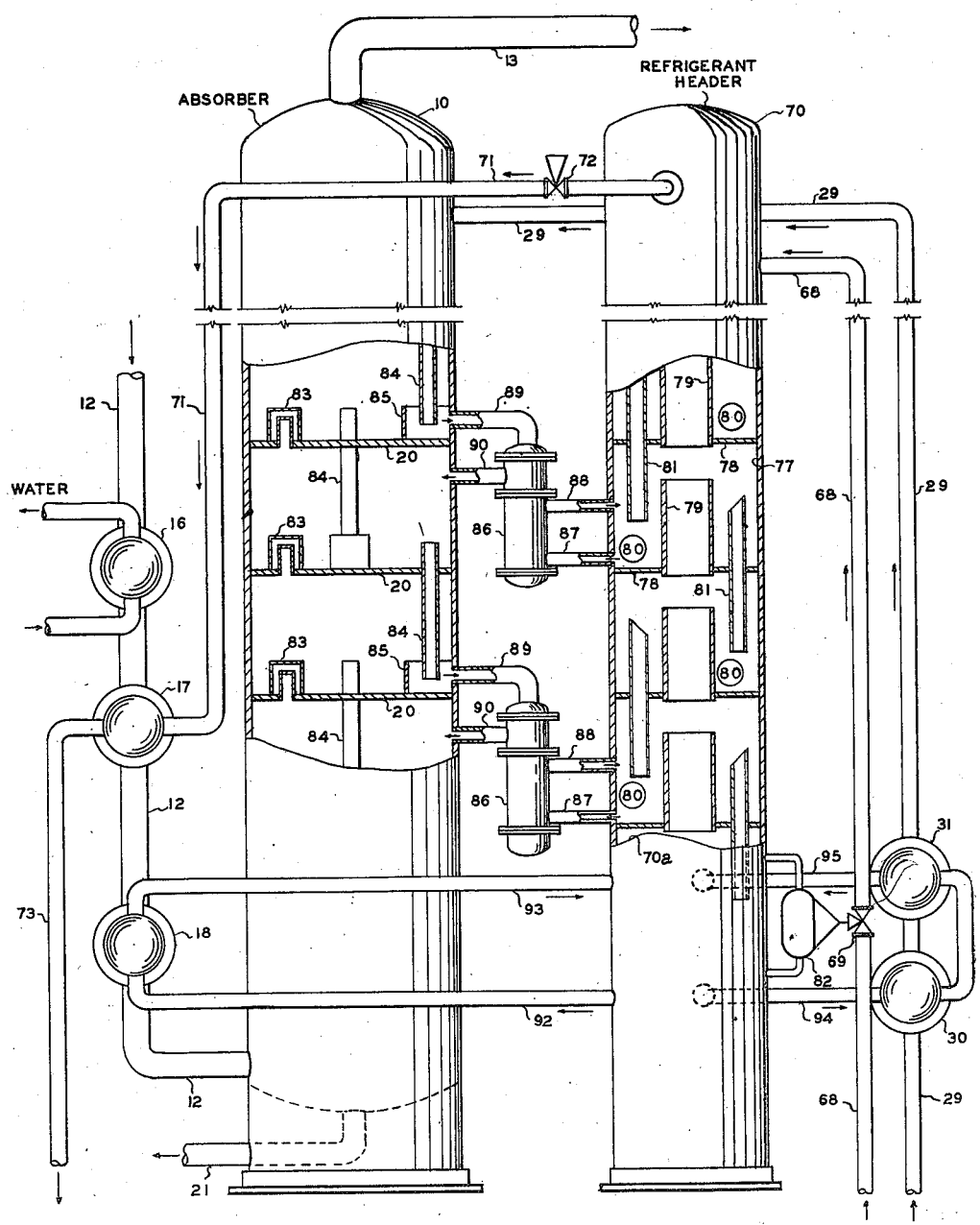
Fig. 2 shows a detail of apparatus utilized in cooling absorbents during the absorption operation.

As shown in Fig. 2 refrigerant header 70 comprises a cylindrical shell 77 vertically arranged along side absorber 10 and fitted with a series of vertically spaced trays 78 welded to the interior of the shell. Each of the trays 78 has a centrally located riser 79 which provide a central passageway for refrigerant vapors rising through the header and form annular reservoirs 80 on each of the trays between shell 77 and risers 79. Each of the trays is also fitted with an overflow pipe 81 the upper end of which is below the level of the upper end of the corresponding riser 79 and the lower end of which is below the upper end of the overflow pipe on the next lower tray 78. The bottom section 70a of header 70, below the lowermost tray 78, has a liquid level controller 82 which is operatively connected to valve 69 to control the rate of admission of refrigerant into header 70 from tank 62, and to maintain a constant liquid level in the lower portion 70a of header 70.

Absorber 10 is equipped with conventional bubble trays 20 having the usual bubble caps and vapor nozzles 83, overflow pipes 84 and liquid reservoirs 85 to seal the lower ends of overflow pipes 84.

Mounted between absorber 10 and header 70 are a series of shell and tube type coolers 86. Pipes 87 and 88 connect each one of the reservoirs 80 to the shell of a corresponding cooler 86 for circulating liquid refrigerant therethrough. A pipe 89 leads from one of the reservoirs 85 on a tray 20 of absorber 10 into the tube section of a corresponding cooler 86 and a return pipe 90 leads from the cooler tubes back into absorber 10 at a point below the tray 20 from which pipe 89 extends.

Each of coolers 86 is so positioned with respect to the trays in absorber 10 and header 70 to which it is connected that flow of absorbent through the tube sections will be a gravity flow, while that of the refrigerant through the shell section will be a gravity flow induced by the head of liquid in reservoir 80 assisted by a thermosyphon flow set up in the shell of the cooler when the refrigerant is heated by interchange with the warmer absorbent.

Pipes 92 and 93 connect one of the lower trays 78 of header 70 to cooler 18 for circulating liquid refrigerant therethrough in cooling relationship to the gas entering absorber 10 through pipe 12. Pipes 94 and 95 connect the portion of header 70 below the lowermost tray 78 to coolers 30 and 31 in series for circulating liquid refrigerant therethrough in cooling relationship to the light absorbent flowing to absorber 10 through pipe 29.

The cooling apparatus, above described, is utilized in the following manner in connection with the absorption operation conducted in absorber 10.

A supply of liquid refrigerant, preferably propane, is transferred from tank 62 through pipe 68 and valve 69 into refrigerant header 70. The pressure on the refrigerant is reduced on entering header 70 by suitable manipulation of valve 72 whereby a portion of the liquid refrigerant is permitted to evaporate upon entering the header. The evaporation of the refrigerant will produce a cooling effect which will cool the unvaporized portion of the refrigerant to a degree dependent upon the proportion vaporized. The refrigerant vapors separate in header 70 from the remaining liquid refrigerant and are vented from header 70 through pipe 71 under control of valve 72. The vapors flow through refrigerant cooler 17 where they supply cooling to the gas passing through pipe 12 into absorber 10, and the vapors then flow through pipe 73 to compressor 74 as above described.

The liquid refrigerant remaining in header 70 and cooled to a suitable refrigerating temperature by the evaporation of a portion thereof, flows downwardly through header 70 over trays 78 and collects in a series of pools in reservoirs 80 and in a pool in the section 70a of the header 70. Liquid refrigerant is circulated from reservoir 80 through each of the coolers 86 by means of pipes 87 and 88. Absorption menstruum in absorber 11 flows from trays 20 through their respective coolers 86 into indirect heat exchange relationship with the liquid refrigerant and is cooled thereby before returning to absorber 10.

The refrigerant warmed by the heat exchange with absorbent returns from each of coolers 86 through respective pipes 88 to the reservoir 80 from which it came originally. Warming of the refrigerant causes a portion thereof to vaporize upon return to header 70 and the resultant vapors escape through risers 79 to the upper portion of the header and are vented therefrom through pipe 71 together with the other refrigerant vapors previously referred to.

Other liquid refrigerant is circulated from the pool thereof in section 70a through cooler 18 for additionally cooling the gas passing to absorber 10. Liquid refrigerant from this pool is also circulated through coolers 30 and 31 for the purpose of cooling the absorbent menstruum flowing through pipe 29 into absorber 10.

By controllably refrigerating the gases and absorbent entering absorber 10 in the above described manner, the temperature at which these fluids are contacted with each other is maintained substantially below the temperatures normally obtainable with ordinary cooling water. As the absorbent flows downwardly through absorber 10, absorbing constituents from the gas, heat of absorption is liberated therein by the absorbed constituents. By removing the downflowing absorbent or a part thereof at spaced intervals along the absorber and passing the removed absorbent through coolers 86 this heat of absorption is removed from the menstruum by heat exchange with the liquid refrigerant and a substantially uniform relatively low temperature of absorption is maintained throughout absorber 10 thereby greatly increasing the efficiency of extraction of desirable low boiling constituents from the gas.

The temperature thus maintained in absorber 10 ranges generally from about 60 degrees F. at the foot of the absorber to about 50 degrees F. at the top thereof. These temperatures may be raised or lowered by correspondingly changing the temperature of the refrigerant and varying the volumes of absorbent and refrigerant exchanging heat with each other. Ordinarily the temperature is maintained above the freezing point of water, which is usually present in the gas, but as near that temperature as it may be most economical to operate.

The pressure maintained in the absorbers is generally about 45 pounds gage as this relatively low pressure is found to be most economical when using the artificial cooling in absorber 10.

The temperatures and pressures in absorber 11 are generally about the same as those used in conventional practice in connection with mineral seal oil absorbents. Due to the cooling applied to the gas in absorber 10 the gas passing from that absorber to absorber 11 will be cooler than in ordinary practice and is of advantage in increasing the efficiency of extraction in absorber 11 and reducing the rate of circulation of heavy absorbent.

The pressures and temperatures maintained in stills 23 and 40 will also be variable depending upon the degree of stripping of absorbents which it is desired to effect and the composition of the products to be recovered.

In still 23, the fact that the rich oil fractionated therein is very rich in high vapor pressure constituents and that only a relatively rough separation of light from heavy constituents is necessary, no process steam for stripping is required and only enough heating steam to supply heat of vaporization of the light constituents is required, thereby providing a material saving in steam costs.

In still 40, the rich oil will contain only a comparatively small quantity of relatively light constituents, and because of wide difference in boiling ranges and vapor pressures between these constituents and the absorption menstruums, relatively little stripping steam will be required.

As a specific example of the application of the combined process above described to the recovery from natural gas of desirable hydrocarbon constituents including at least 95 percent of the butane, the following data is cited.

Charge 15,000,000 cubic feet gas per day.
Analysis of charge:

| Constituent: | Mol. Percent |
|---|---|
| Methane | 40.6 |
| Ethane | 14.8 |
| Propane | 25.3 |
| Butane | 13.4 |
| Pentane and heavier | 5.9 |
| Total | 100.00 |

The residue gas vented from the second absorber had the following composition:

| Constituent: | Mol. Percent |
|---|---|
| Methane | 55.9 |
| Ethane | 19.3 |
| Propane | 23.5 |
| Butane | 1.2 |
| Pentane and heavier | 0.1 |
| Total | 100.00 |

The final product obtained from the above operation comprised about 120,000 gallons per day of gasoline containing more than 98 per cent of the butanes in the original gas and was substantially propane free.

Operating conditions used in the absorption and cooling steps in obtaining these results were as follows:

Temperatures

| | Degrees F. |
|---|---|
| Absorber 10—top | 50 |
| Absorber 10—bottom | 60 |
| Propane liquid in header 70 | 35–40 |
| Still 23—bottom | 350 |
| Still 23—top | 175 |
| Absorber 11—top | 90 |
| Absorber 11—bottom | 80 to 85 |
| Still 40—bottom | 350 |
| Still 40—top | 220 |

Pressures

| | Pounds per square inch |
|---|---|
| Absorber 10 | 95 |
| Absorber 11 | 43 |
| Still 23 | 100 |
| Header 70 | 65 |
| Tank 62 | 190 |
| Still 40 | 30 |

| Oil rate: | Gallons per minute |
|---|---|
| Absorber 10 | 250 |
| Absorber 11 | 150 |

| Light absorbent used in absorber 10: | Deg. F. |
|---|---|
| API gravity | 60–62 |
| 1 BP | 175 |
| 90% | 250 |
| F. B. P | 350 |

| Heavy absorbent used in absorber 11: | Deg. F. |
|---|---|
| API gravity | 38–40 |
| 1 BP | 350 |
| F. B. P | 550 |

Conditions in Stabilizer 54:
Pressure\_\_\_\_\_pounds per square inch\_\_ 250
Temperature—bottom\_\_\_\_\_degrees F\_\_ 250
Temperature—top_____do\_\_\_\_ 90

In the foregoing operation, the reflux collected in receiver 57 was substantially pure propane and enough of this material was condensed from the vapors in pipe 55 by means of condenser 56 to supply sufficient reflux material to condense substantially all of the butanes in the final product leaving the system through pipe 64 while providing sufficient excess propane to supply refrigerant for use in cooling absorber 10.

Where it is desired to recover propane or ethane, the only changes in the above described process which need be made are a relatively small increase in the circulation rate of the light absorbent and changes in the rectification conditions in stabilizer 54 to condense these lighter constituents in the final product of the process.

By means of the herein described process and apparatus a highly efficient and economical system is provided for the recovery of maximum amounts of desirable hydrocarbons, including butane and lighter constituents from natural gas and the like.

By using the dual absorption and cooling system of this invention, the combined volume of the absorbents circulated per unit of time through both absorbers is reduced to approximately one-third that required by a conventional absorption system, while, at the same time, greatly increasing the efficiency of extraction of desirable constituents from the gas, thereby accomplishing a major saving in costs of equipment for circulating absorbents and in amount and cost of power required.

It will be noted also that the absorption operation itself is conducted under relatively low pressures, permitting utilization of relatively low cost apparatus therefor, thus providing an additional material saving in cost.

It will be understood that numerous modifications and alterations may be made in the details of the process and apparatus without departing from the scope of the appended claims.

What I claim and desire to secure by Letters Patent is:

1. A process for separating gases which comprises passing gases through successive absorption stages, contacting the gases in an earlier absorption stage with a relatively light absorbent, extracting the heat of absorption from said light absorbent by progressive cooling thereof substantially throughout its passage through said earlier absorption stage, subjecting said light absorbent to an incomplete stripping operation, returning the incompletely stripped absorbent directly to said earlier absorption stage, then connecting the gases in a later absorption stage with a relatively heavy absorbent, completely stripping said heavy absorbent in a separate stripping operation, and returning the completely stripped absorbent directly to said later absorption stage.

2. A process for separating gases which comprises passing gases through successive absorption stages, contacting the gases in an earlier absorption stage with a relatively light absorbent comprising relatively heavy constituents recovered from the gases, extracting the heat of absorption from said light absorbent by progressive cooling thereof substantially throughout its passage through said earlier absorption stage, subjecting said light absorbent to a stripping operation to separate relatively light from relatively heavy constituents recovered by said light absorbent from the gases, returning a portion of said relatively heavy constituents directly to said earlier absorption stage, contacting said gases in a later absorption stage with an absorbent heavier than that utilized in said earlier stage, completely stripping the latter absorbent, and returning the resulting completely stripped absorbent directly to said later absorption stage.

3. A process for separating gases which comprises passing gases through successive absorption stages, contacting the gases in an earlier absorption stage with an absorbent comprising relatively heavy constituents recovered from the gases, then contacting the gases in a later absorption stage with an absorbent heavier than the recovered constituents, stripping both said absorbents to separate recovered constituents therefrom, separating from said recovered constituents a portion thereof having expansion refrigeration properties, and bringing said portion into a plurality of cooling contacts with the absorbent in said earlier absorption stage to thereby progressively extract the heat of absorption from the absorbent substantially throughout its passage through said earlier absorption stage.

4. The process of recovering gasoline from natural gas which comprises passing the gas through successive absorption stages, contacting the gas in an earlier absorption stage with a relatively light absorbent composed of gasoline constituents recovered from the gas to thereby recover gasoline and lighter constituents including propane from the gas, passing said light absorbent in its passage through said earlier absorption stage through a concurrent series of cooling zones, then contacting the gas in a later absorption stage with an absorbent heavier than said gasoline constituents to thereby recover additional gasoline and lighter constituents from gas, subjecting both said absorbents to stripping operations to separate therefrom absorbed gasoline and lighter constituents including propane, subjecting the separated constituents to fractionation and condensation operations to separate gasoline constituents from liquid propane and vaporizing a portion of the liquid propane to thereby cool the unvaporized portion thereof to sub-atmospheric temperatures, and passing cooled propane through said series of cooling zones in indirect heat exchange relationship with said relatively light absorbent.

5. In a process of recovering gasoline from natural gas comprising passing the gas through successive absorption stages, contacting the gas in an earlier absorption stage with a counter-current stream of a relatively light absorbent composed of gasoline constituents recovered from the gas and then contacting the gas in a later absorption stage with an absorbent heavier than the recovered gasoline constituents, the steps of continuously extracting the heat of absorption from said light absorbent and cooling same to sub-atmospheric temperatures temperatures comprising passing said light absorbent in its passage through said earlier absorption stage progressively through a series of heat exchange zones arranged therein in the path of flow of said light absorbent and passing a refrigerant fluid through each of said zones in indirect heat exchange relationship with said light absorbent.

6. In an absorption process for separating gases, wherein the gases are subjected to counter-current contact with a stream of a liquid absorbent, the steps of extracting the heat of absorption from the absorbent during its contact with said gases and of cooling the absorbent to sub-atmospheric temperatures, comprising, establishing a pool of a liquid refrigerant cooled to sub-atmospheric temperature, establishing a series of cooling zones in the path of flow of said absorbent, passing said absorbent progressively through said series of cooling zones and circulating said liquid refrigerant from said pool through said cooling zones in indirect heat exchange relationship with said absorbent at a rate sufficient to extract the heat of absorption from said absorbent and to cool same to sub-atmospheric temperatures to thereby maintain a substantially uniform sub-atmospheric temperature gradient in the absorbent during the period of contact of the gases therewith.

7. In an absorption process for separating gases wherein the gases are subjected to counter-current contact with a stream of liquid absorbent in an absorption zone, the steps of cooling the gases to sub-atmospheric temperature before entering said absorption zone, cooling said absorbent to substantially the same sub-atmospheric temperature before introducing same into said absorption zone, and maintaining said sub-atmospheric temperature substantially uniformly throughout said absorption zone by subjecting said absorbent to additional sub-atmospheric cooling in its passage through said absorption zone.

PAUL M. RAIGORODSKY.